J. W. WILLIS.
AUTOMATIC FRUIT PICKER AND CONVEYER.
APPLICATION FILED JUNE 4, 1914.
1,132,818.
Patented Mar. 23, 1915.
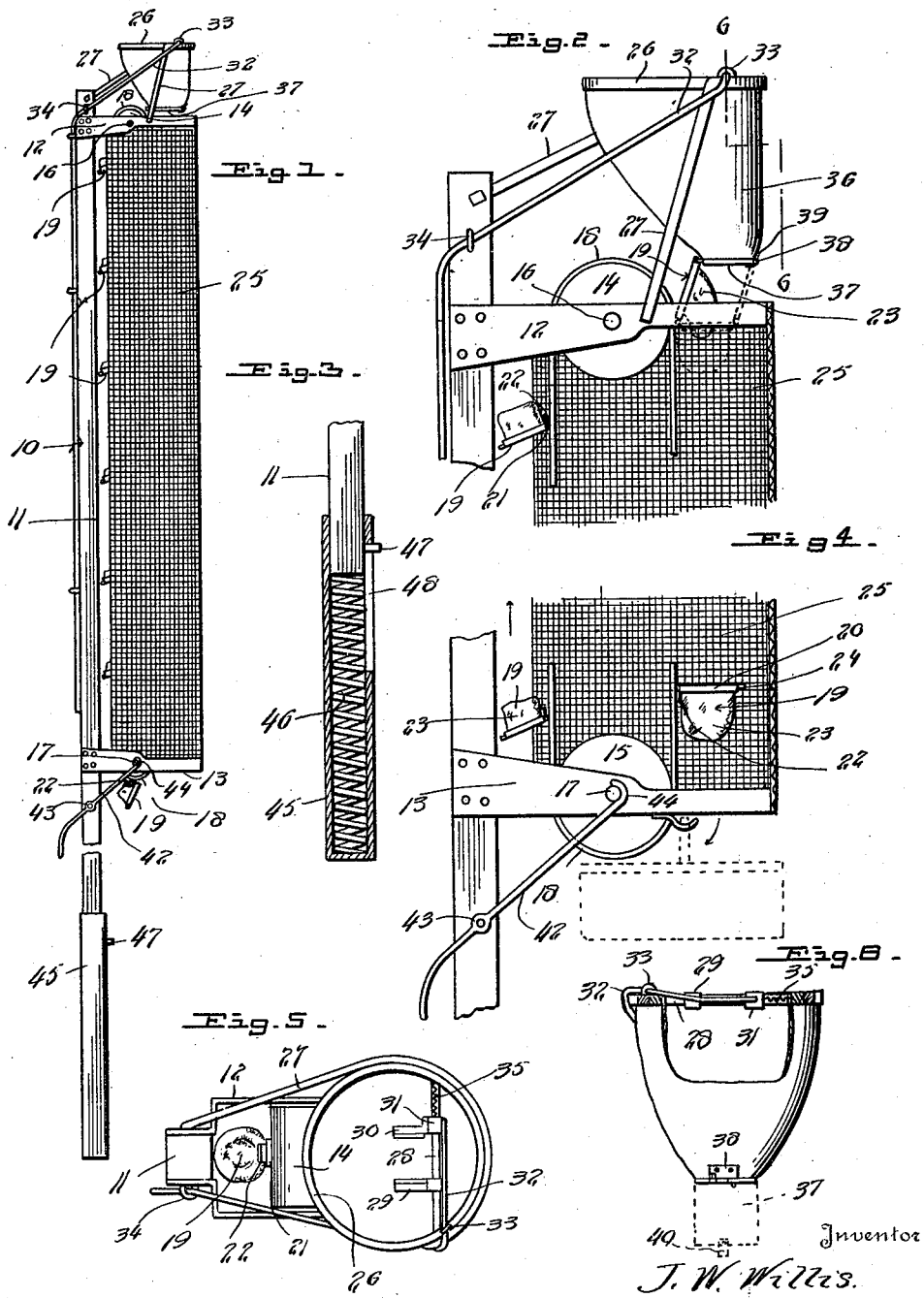
Witnesses
Inventor
J. W. Willis.
By
Attorneys

UNITED STATES PATENT OFFICE.

JOSEPH W. WILLIS, OF ANSONIA, CONNECTICUT.

AUTOMATIC FRUIT PICKER AND CONVEYER.

1,132,818.      Specification of Letters Patent.    Patented Mar. 23, 1915.

Application filed June 4, 1914. Serial No. 843,043.

*To all whom it may concern:*

Be it known that I, JOSEPH W. WILLIS, a citizen of the United States, residing at Ansonia, in the county of New Haven, State of Connecticut, have invented certain new and useful Improvements in Automatic Fruit Pickers and Conveyers; and I do hereby declare the following to be a full, clear, and exact description of the invention, such as will enable other skilled in the art to which it appertains to make and use the same.

This invention relates to harvesting devices, particularly to devices for the harvesting of fruit from trees, and has for its object the provision of a novel device by means of which fruit may be picked and gently conveyed to the ground or a receptacle without being bruised or otherwise injured.

An important object is the provision of a device of this character which is provided with manually operated means for cutting the stems of the fruit and a conveyer for receiving and carrying the fruit to the ground or a receptacle, the conveyer being actuated by the weight of the fruit.

An additional object is the provision of a device of this character having means whereby each piece of fruit is individually carried by the conveyer.

Another object is to provide a device of this character which is so constructed that it cannot catch in or interfere with the branches or leaves of a tree.

Still another object is the provision of means whereby the speed of travel of the gravity operated conveyer may be regulated.

Other objects and advantages such as simplicity, comparative cheapness in manufacture, efficiency and durability in service, together with the general improvement of the art will be carefully brought out in the following description and illustrated in the accompanying drawing, in which—

Figure 1 is a side elevation of my complete device, Fig. 2 is a side elevation of the upper portion of the device on a larger scale with the guard screen in section, Fig. 3 is an enlarged sectional view through the lower portion of the standard or support, Fig. 4 is an enlarged side elevation of the lower portion of my device, Fig. 5 is a top plan view of the device, and Fig. 6 is a view along the line 6—6 of Fig. 2.

Referring more particularly to the drawing, the numeral 10 designates the supporting standard of my device, which comprises a vertical staff 11 to which are secured upper and lower laterally extending brackets 12 and 13. Pulleys or rollers 14 and 15 are secured upon shafts 16 and 17 journaled through the upper and lower brackets 12 and 13, respectively. An endless belt 18 is trained about the pulleys 14 and 15 and carries a plurality of conveyer buckets designated as a whole by the numeral 19. Each of the conveyer buckets comprises a ring 20 of rigid material pivotally secured as at 21 upon the belt 18 and provided with a laterally extending arm 22 adapted to engage the face of the belt for holding the ring 20 normally at right angles to the belt. The body portion of each bucket is formed preferably as a sack or pocket 23 of flexible material, such as canvas, secured to the ring 20. The outer edges of the bucket rings 20 are provided with lugs 24 for a purpose to be described.

In order that the conveyer may not become entangled with the branches of a tree from which it is desired to remove the fruit, I preferably provide a guard 25, of wire screen or the like, surrounding the conveyer and having its side edges connected with the staff 11 and its top and bottom edges connected with the brackets 12 and 13.

In order that fruit may be picked from the tree, I provide a bracket upon the upper end of my device, the bracket comprising a hoop member 26 having arms 27 connected with the staff 11 and the upper bracket 12. A cross bar 28 extends transversely of the hoop member 26 and is provided with a stationary knife blade 29 adapted to coöperate with a movable blade 30 carried by a sleeve 31 slidable on the cross bar 28. In picking fruit from a tree, the device is disposed so that the fruit will extend within the hoop member 26 with its stem preferably near the blade 29. In order to sever the stem I provide a flexible member which may be a cord or fine wire 32 extending along the staff 11, trained through screw-eyes or the like 33 and 34 and connected with the slidable sleeve 31, the member 32 being pulled to bring the movable knife blade 30 against the stem of the fruit. When the member 32 is released, the sleeve 31 carrying the knife blade 30 will be returned to its original position by a coil spring 35 connected with the sleeve and the hoop. In order to conduct fruit thus severed to the conveyer, I provide a hopper 36 secured to the hoop member 26 and provided at its lower end with a trap door 37 hinged as at 38 upon the hopper 36 and normally held closed by a coil spring 39 surrounding its pintle. The front edge of the trap door 37 is provided with a lug 40 disposed in the path of travel of the conveyer buckets 19.

The device is set in operation by the operator pulling upon the belt 18 until one of the bucket rings 20 engages the lug 40 on the trap door 37 by means of its extending lug 24, after which continued movement of the belt 18 will cause the lug 24 to open the trap door 37, whereupon the trap door will be held temporarily open, as shown by dotted lines in Fig. 2, and then will fly shut by the action of the spring in position to receive more fruit. The piece of fruit previously picked from the tree as described will then fall into the bucket 19, whereupon the weight of the fruit will cause the belt to be moved downwardly, as indicated by the arrow, until the bucket passes around the lower pulley 15. By virtue of the fact that the buckets are pivotally connected with the belt 18, when they reach this position they will swing upon their pivots and the frames 20 will be disposed at an acute angle to the belt 18 and will remain in this position until they pass over the upper pulley 14, whereupon the lug 24 on each bucket will engage the lug 40 on the trap door 37 and open it, this operation continuing as long as there are any filled buckets. It is necessary that the buckets be pivotally connected with the belt 18 in order that they may operate to swing the door 37 open and hold it so for a short length of time.

It will of course be apparent that when the filled buckets reach the lower pulley 15 the fruit carried thereby will be emptied and will fall upon the ground, into a sack, or deposited within a basket or the like which may be suspended from a suitable hook as shown on the lower bracket 13.

From the foregoing description and a study of the drawing it will be apparent that the fruit picked will be deposited individually within the buckets and will be conveyed therein to the ground, the conveyer operating continuously by the weight of the fruit.

In order that the movement of the belt 18 may be regulated so that excess speed may be prevented, I provide a brake which comprises a lever 42 pivoted as at 43 upon the staff 11 and provided with a hooked end 44 partially embracing the lower pulley shaft 17. In order to slacken the speed of the conveyer, it is merely necessary that the operator press downwardly upon the outer end of the lever 42 which will cause the hooked end 44 to engage the shaft 17 with a sufficient degree of friction to serve as a brake.

In the use of my device, the standard 10 is adapted to rest upon the ground. In order that low hanging fruit may be conveniently picked, I provide the lower end of the standard with a hollow sleeve 45 slidably receiving the staff 11. A coil spring 46 is disposed within the sleeve 45 and abuts against the lower end of the staff 11. The staff 11 is prevented from slipping out of the sleeve 45 by a pin 47 secured on the staff and extending through a slot 48 in the sleeve. When it is desired to pick low hanging fruit, it is merely necessary to pull downwardly upon the staff 11, thus forcing it into the sleeve 45 and lowering the upper end of the device.

From the foregoing description and a study of the drawing it will be observed that I have thus provided a fruit harvesting device which will be simple and rapid in operation and which will deposit the fruit picked upon the ground or in a receptacle without bruising or otherwise injuring the fruit.

It will be readily understood that I reserve the right to make various changes in the form, construction, arrangement and combination of parts without departing from the spirit of the invention or limiting the scope of the subjoined claims.

Having thus described my invention, I claim:

1. A device of the character described comprising a supporting standard, a conveyer mounted thereon, a hopper connected with the upper end of said supporting standard and adapted to receive fruit, a movable knife blade above said hopper for severing the stems of fruit, means for operating said knife, a normally closed trap door in the lower portion of said hopper, and means actuated by the movement of said conveyer for intermittently opening said trap door whereby fruit within said hopper will fall upon said conveyer.

2. A device of the character described comprising a standard, rollers journaled adjacent the upper and lower ends of said standard, an endless belt trained about said rollers, a plurality of buckets secured on said belt, a hopper secured upon the upper end of said standard and adapted to receive fruit, cutting mechanism disposed within the upper end of said hopper, and means actuated by said buckets for permitting the passage of fruit from said hopper into said buckets, said belt being movable by the weight of fruit within said buckets.

3. A device of the character described, comprising a standard, a pair of brackets secured adjacent the upper and lower ends of said standard, rollers journaled through said brackets, an endless belt trained about said rollers, a plurality of buckets pivotally mounted on said belt, a hopper mounted on the upper end of said standard, cutting mechanism disposed at the upper end of said hopper, and a normally closed spring pressed trap door in the bottom of said hopper, said buckets engaging the free edge of said trap door whereby said trap door will be opened to permit the passage of fruit from said hopper into said buckets, said endless belt being moved by the weight of the fruit within the buckets.

4. A device of the character described comprising a supporting standard, a vertically disposed conveyer associated therewith and including a plurality of buckets adapted to swing vertically, a hopper secured upon the upper end of said standard, cutting mechanism disposed upon the upper end of said hopper, and a normally spring closed door closing the bottom of said hopper, said door being opened by the engagement of the edges of said buckets with the edge of said plate, whereby fruit within said hopper will be conducted to said buckets.

In testimony whereof, I affix my signature, in the presence of two witnesses.

JOSEPH W. WILLIS.

Witnesses:
FREDERICK M. DREW, Jr.,
CHARLES E. REMER.

Copies of this patent may be obtained for five cents each, by addressing the "Commissioner of Patents, Washington, D. C."